United States Patent [19]

Göertz

[11] Patent Number: 4,755,991

[45] Date of Patent: Jul. 5, 1988

[54] RING SHAPED DIGITAL COMMUNICATION SYSTEM AND METHOD FOR ACCESSING A MESSAGE CHANNEL IN SUCH SYSTEM

[75] Inventor: Hendrik M. H. G. Göertz, Eindhoven, Netherlands

[73] Assignee: U.S. Philips Corp., New York, N.Y.

[21] Appl. No.: 882,866

[22] Filed: Jul. 7, 1986

[30] Foreign Application Priority Data

Jul. 15, 1985 [NL] Netherlands .................... 8502024

[51] Int. Cl.$^4$ ............................................... H04J 3/00
[52] U.S. Cl. ......................................... 370/86; 370/89
[58] Field of Search ............................. 370/89, 85, 86; 340/825.5, 825.05, 825.06, 825.07

[56] References Cited

U.S. PATENT DOCUMENTS

| | | | |
|---|---|---|---|
| 4,553,234 | 11/1985 | Brandsma et al. | 370/89 |
| 4,566,098 | 1/1986 | Gammage et al. | 370/89 |
| 4,596,013 | 1/1986 | Tashiro et al. | 370/85 |

*Primary Examiner*—Douglas W. Olms
*Assistant Examiner*—James E. Busch
*Attorney, Agent, or Firm*—Thomas A. Briody; Jack Oisher; Leroy Eason

[57] ABSTRACT

A ring-shaped TDM digital communication system and method for enabling stations connected thereto to obtain access to a common message channel available for all of the stations. Access is unambiguously determined by an arbitration procedure which selects the station which obtains access to the message channel and excludes all other stations. Such message channel is also used for the arbitration procedure, which is based on recognizing the channel as being unoccupied if the value of the information in a time slot field thereon remains the same in successive cycles around the ring of a TDM frame comprising such field. The messages which are transmitted are structured so that error detection and correction, addressing, congestion indication, etc., can easily be included.

6 Claims, 2 Drawing Sheets

RING SHAPED DIGITAL COMMUNICATION SYSTEM AND METHOD FOR ACCESSING A MESSAGE CHANNEL IN SUCH SYSTEM

FIELD OF THE INVENTION

The invention relates to a method of accessing and utilizing a message channel in a digital communication system arranged for transmitting digital information between stations which are coupled to a unidirectional transmission ring, the ring including a monitor for generating an integral number of time-division multiplex frames on the ring, in each of which frames a plurality of types of time slot fields can be distinguished and fields of the same type in consecutive frames together provide a corresponding number of channels for transmitting digital information between the stations.

The invention further relates to such a system comprising a ring access arrangement for performing the above described method.

DESCRIPTION OF RELATED ART

Such as method and system are disclosed in published European Patent Application EP No. 0115658, which corresponds to U.S. Pat. No. 4,553,234, issued Nov. 12, 1985.

Such a method can be used in LAN's (Local Area Networks), more specifically in broadband, time-division multiplex ring networks which support circuit and/or packet-switched traffic. The continuous traffic such as telephone and videophone traffic is switched to a LAN circuit, that is to say that after a connection has been set-up (with the aid of signalling messages) and for the entire duration of the connection, transmission capacity is assigned to the communication participants. The need for transmission capacity for transmitting signalling messages (in the form of data packets) is not only present before a connection is set-up, but during the connection and also for releasing a connection. For the transmission of these data packets the majority of LAN's provide what is commonly referred to as a datagram service. Generally the transmission of a packet is effected without prior knowledge whether the receiver is present and not occupied. In addition, it is generally not known to the transmitter whether the receiver has free buffers. The correct reception is often not reported, so that automatic retransmission is also impossible. Solving these problems is left in those systems to the higher protocol layers.

SUMMARY OF THE INVENTION

It is an object of the invention to provide a method by which access of one station to an arbitration-annex message channel available to all stations can be ensured unambiguously. It is a further object of the invention to provide a method of utilising an arbitration-annex message channel, in which the absence of the station for which the message is intended and the maximum storage capacity of (the buffer of) the addressed station and any occurring transmission errors are taken account of. Such method achieves access to and utilization of an arbitration-annex message channel in a communication system arranged for transmitting digital information between stations which are coupled to a unidirectional transmission ring, the ring including a monitor for generating an integral number of time-division multiplex frames on the ring, in each of which frames a plurality of types of time slot fields are distinguished and fields of the same type in consecutive frames together providing a corresponding number of channels for transmitting digital information between the stations. Such method is characterized in that at least one of the channels is arranged as an arbitration-annex message channel, that a station wanting to transmit a message performs the following steps:

(a) the fields of the arbitration channel are read until it is apparent from the information read that the arbitration channel is free: the value "NULL" is then assigned to the information read;

(b) in the first field of the arbitration channel subsequent to the read "free" field, the information contained in that field is exchanged by the station for information coming from the station and having the meaning "OCCUPIED";

(c) if the information read in step (b) already has the value "OCCUPIED", the relevant station continues with step (a); and in the case in which the information read in step (b) has the value "NULL" the relevant station has won this arbitration phase and has consequently obtained access to the arbitration-annex message channel;

the station which has won the arbitration places its message in one field or in a plurality of consecutive fields of the arbitration-annex message channel, the message being assembled from one or a plurality of characters and an information portion, the characters being indicative of the beginning of the message, the end of the message, the destination address of the message, reporting the presence of station congestion or correctness reporting.

This method has the advantage that it is fully distributed. Thus, there is no central, and consequently vulnerable, arbitration function.

A further advantage of this method is that every arbitration has exactly one winner, thus preventing mutulation of messages by two or a plurality of stations utilising the same channel. A further advantage is that the method is stable, that is to say the "throughput" of the system as a function of the load is monotonous non-decreasing. Another advantage is that assigning the message channel is fair: every participant in the method is certain of winning the arbitration procedure within a predetermined maximum number of efforts. More specifically it could be made impossible that if a plurality of candidates wait for the message channel to be enabled, the participant releasing the channel can reserve the channel again before the channel is assigned to other participating stations.

A further advantage is that the system continues to operate correctly, even when transmission errors occur or when a station becomes inoperative.

If there are a plurality of frames in a ring cycle then in certain circumstances exactly the same number of participating stations can win the arbitration for the message channels as there are frames in a frame cycle. To provide in such cases an unambiguous channel assignment it is advantageous that, if there are two or more frames on the ring, the two or more stations which had won the arbitration perform after arbitration step (c) the following steps for the purpose of final arbitration:

(d) during one ring cycle period the content of all the fields associated with the arbitration-annex message channel is exchanged by the remaining stations for the unique address value of the relevant station;

(e) the information contained in the arbitration channel fields are exchanged for the address value originating from the relevant station until the address value read is judged in accordance with the criteria defined in the following steps;

(f) a station withdraws from the arbitration and continues step (a) if the address value read exceeds its own address value;

(g) a station continues the arbitration if the address value read is less than its own address value;

(h) a station has won the final arbitration when the address value read is equal to its own address value written during this arbitration by the relevant station.

It is a further object of the invention to provide a system for performing the method of accessing and utilizing a message channel in a communication system, the communication system being adapted for transmitting digital information between stations coupled to a unidirectional transmission ring, the ring including a monitor for generating an integral number of time division multiplex frames in the ring, in each of which frames a plurality of types time of slot fields is distinguished and fields of the same type in consecutive frames together forming a corresponding number of channels for transmitting digital information between the station. The system is characterized in that each station comprises a ring read arrangement, a ring exchange arrangement, a combining arrangement and a processing arrangement, that the processing arrangement includes a write arrangement for entering into a register the messages received from the ring read arrangement or the combining arrangement, that the processing arrangement further includes a read arrangement for reading from the register a predetermined message contained in the register, that the processing arrangement includes a comparator for comparing the messages received from the ring read arrangement and the read arrangement, and that the combining arrangement is coupled to an output of the read arrangement for deriving the system bit therefrom and is also coupled to a terminal for applying messages.

BRIEF DESCRIPTION OF THE DRAWINGS

The invention will now be described in greater detail by way of example with reference to the accompanying Figures, components denoted in the Figures by the same reference symbols being identical. Therein.

DESCRIPTION OF THE PREFERRED EMBODIMENTS

Figure 1:
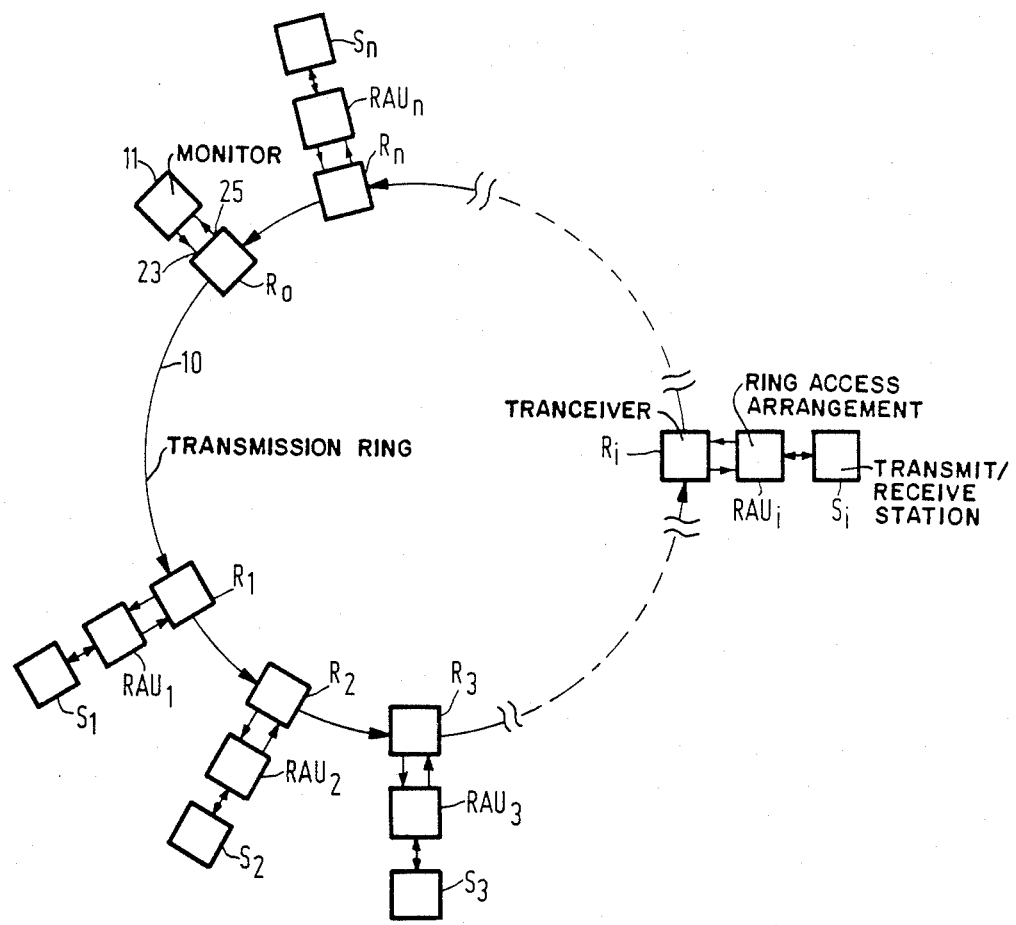
FIG. 1 is a diagram of a transmission system in the form of a ring as in EP 0115658 and to which stations are connected which are capable of transmitting information to each other in accordance with the method according to the invention.
Figure 2:
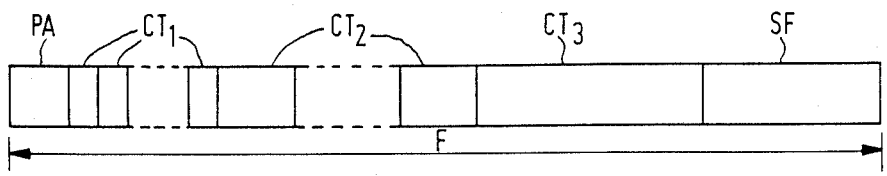
FIG. 2 is a graphical representation of the lay-out of a frame used in the ring in FIG. 1 for performing the method according to the invention.

FIG. 1 shows a ring-shaped unidirectional transmission system 10 which may, for example, comprise optical fibres, coaxial cables or twisted wires, as shown in EP 0115658. Transceivers $R_i$, i=1, 2, ... n are included in the ring, inter alia for the purpose of transmitting signals via ring 10 and receiving signals from ring 10 and to maintain the signal intensity in the ring at an appropriate level. Stations $S_i$, i=1, 2, ... n are connected to the transceivers $R_i$ via ring access arrangements $RAU_i$, i=1, 2, ... n. A station may, for example, be a telephone set, a computer terminal, a word processor, a data transmitter or data receiver etc., as the case may be. A monitor 11 which performs a plurality of functions is connected to the ring 10 via a transceiver $R_o$. The monitor generates, for example, a frame structure on the transmission means. FIG. 2 shows an example of such a frame structure. A frame (alternatively denoted "pallet") having a duration F comprises a preamble PA which indicates the beginning of the frame, and in addition a plurality of time slots (alternatively denoted "fields" or "buckets") in which digital information is transmitted. The time slots do not all have the same durations: in the example shown in FIG. 2 time slots of a first type, a second type and a third type can be distinguished. Time slots in consecutive frames provide a channel, each time slot of the first type forming part of a channel of the first type, each time slot of the second type forming part of a channel of the second type and each time slot of the third type forming part of a channel of the third type.

It should be noted that the terms "frame" and "time slot" used here have a meaning which is not fully covered by the usual definition of these terms. At one and the same instant different stations can access different time slots, associated with one specific frame, whilst conversely one specific time slot in one frame can be accessed by all the stations at different instants. In all those instances for which it is assumed to be necessary for an understanding of the invention, the word "pallet" can be read for "frame" and the word "bucket" for "time slot".

In FIG. 2 the channels of the first, second and third types, respectively, are indicated by $CT_1$, $CT_2$ and $CT_3$, respectively. In addition, each frame F includes a field SF in which a number of time slots are accommodated for transmitting system and control information. By way of example, the following arrangement of a frame F may be used.

Duration of the frame: 125 μsec.

Bit rate: 20.48 Mb/s; thus, each frame comprises 2560 bits.

Arrangement of the frame:

| | |
|---|---|
| 32 channels of a first type (64 kb/s); so per frame 32 time slots of 8 bits each | 256 bits |
| 4 channels of a second type (256 kb/s); so per frame 4 time slots of 32 bits each | 128 bits |
| 3 channels of a third type (2 Mb/s); so per frame 3 time slots of 256 bits each | 768 bits |
| 1 channel of a fourth type (8 Mb/s); so per frame 1 time slot of | 1024 bits |
| preamble | 64 bits |
| field SF | 320 bits |
| total | 2560 bits |

The arrangement of a frame is wholly arbitrary; a greater or lesser number of types of a channel may be present and a greater or lesser number of channels per type may be provided. Also the exact position of the channels in the frame is fully arbitrary. All stations must of course know this arrangement. In an operational system each frame has the same structure and the same division in time slots, but, as remarked in the foregoing, each system can choose and modify this stucture at its option.

As described above, a frame has time slots of a number of different types, which types differ in the number of bits transmitted per time slot, and so in the average bit frequency of the relevant channel. At the same time, the time slots differ, however, in the category of traffic supported, namely circuit-switched traffic or packet-switched traffic. Circuit-switched traffic, such as telephone, intercome and videotelephone traffic requires that strictly periodically, uninterruptedly and as long as desired a connection remains in existence between, usually, two stations and moreover usually in both directions simultaneously (full duplex). These requirements are not imposed on packet-switched traffic (text, facsimile, data-link to computer) and it is therefore often advantageous to process this category of traffic in a manner different from circuit-switched traffic.

Depending on the length of the transmission system, one or a plurality of frames ca be simultaneously present on ring 10. Monitor 11 includes a buffer store which has for its function to accurately equate the cycle time to a multiple of the frame period. If the frame period is 125 $\mu$sec and the transmission systems will have a circulating delay time of 550 $\mu$sec, then the monitor will introduce a 75 $\mu$sec delay time by means of a buffer store, as a result of which the ring cycle period is raised to 625 $\mu$sec and 625/125=5 frames will be accommodated within one ring cycle period. This implies that every 5 frames the physically and functionally identical time slot passes a given point on the ring, whilst of course after each frame the functionally identical time slot passes a given point. This distinction is important, as will be explained hereinafter.

Each ring accessing arrangement $RAU_i$ connected to the ring sees an endless stream of frames passing by, but it knows the position and the object of the information in the time slots. A ring access arrangement $RAU_i$ can perform three basic operations on these time slots, namely (1) it can read the content of the time slot passing it, (2) it can write information supplied from station $S_i$ into the passing time slot and (3) it can exchange the content of the passing time slot with the supplied information, that is to say read and write (quasi) simultaneously. It is important to note that what is commonly referred to as "on-the-fly" adaptation of the supplied information to the nature and/or the content of the information read is not desired because of the high rate of the information transport and the flexibility. Consequently, only information which has been previously "prepared" is written into the time slot.

The transportation of information from and to stations $S_i$ is effected via the ring access arrangements $RAU_i$ of those stations. Let it be assumed that, for example, ring access arrangement $RAU_i$ writes 8-bit information into a predetermined time slot in each frame of, for example, 125 $\mu$sec. This information is intended for, for example, station $S_n$. Consequently, ring access arrangement $RAU_n$ reads in each frame (every 125 $\mu$sec) the 8-bits from the relevant time slot. Thus, $8/125.10^{-6} = 64$ kbit/sec is transmitted from station $S_1$ to station $S_n$. When both ring access arrangements $RAU_1$, $RAU_n$ effect the abovementioned exchange operating on the time slot, an exchange of information is obtained, consequently a full duplex channel. By arranging n time slots in parallel, an $n \times 64$ kbit/sec channel is obtained.

Channels are used for all user data, both for circuit and for packet-switched traffic. The arbitration-annex message channel (common channel) is a special channel used by the ring access arrangements RAU to transmit signalling messages. Usually signalling messages are short messages transmitted when a circuit-switched connection is seized, preserved (read ring cost) and released. The messages contain information on the instantaneous state of a station or of the circuit channel used for the circuit-switched connection.

Just like any other channel, the arbitration-annex message channel is formed by one or a plurality of time slots present in the same location in a frame. Each ring access arrangement knows where the arbitration-annex message channel is located and has the obligation to inspect all the time slots thereof. For brevity, the arbitration-annex message channel will be denoted message channel hereinafter.

If more than one ring access arrangement (RAU) wants to transmit a message—which, considering the size of the system, is rather the rule than the exception—then these ring access arrangements must be prevented from writing their messages simultaneously in the message channel since they would consequently mutulate each other's message. The arbitration mechanism described hereinafter provides a solution for that problem in that not more than one ring access arrangement RAU at a time is given the right to utilise the message channel.

Ring access arrangements RAU wanting to transmit a message, denoted "candidates" hereinafter, must, consequently, before they can indeed transmit a message, check whether the message channel is free, and if yes they must reserve this channel. From the data present on the ring circulates it is not possible for a station to find out, on the basis of the fact that a signal is missing or not missing, whether the message channel is occupied or not occupied. So as to offer a station the possibility to find out whether the channel is occupied or not, without the station writing information in the ring for that purpose, a what is commonly referred to as an "empty-time slot" mechanism has been developed. A time slot is considered to be "empty" if the read content of the time slot is the same as the written or read content of that same time slot one ring cycle previously. If the read value of a time slot is the same as the value of that time slot one ring cycle previously, then that time slot does not contain any information and the information value of the content is considered to be NULL. A time slot having the information value NULL is called an "empty time slot".

This has for its result that a ring access arrangement transmitting a message must write in each time slot a value different from the value written therein in the previous ring cycle. Since no limitations must be imposed on the information to be transmitted space has been reserved in each time slot (REC, FIG. 3) of the message channel in addition to space for the information (DATAB, FIG. 3) for what is commonly referred to as a system bit (SYSB, FIG. 3) for the empty-time slot-mechanism. To keep the channel occupied, it is advantageous that the value of this system bit SYSB is inverted every ring cycle. Thus it is ensured that the new content of the written time slot REC differs from the previous value (namely a minimum of one bit position).

Figure 3:
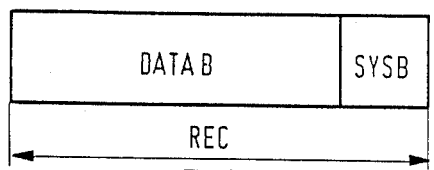
FIG. 3 shows the sub-division of a time slot of a frame for getting access to a message channel according to the method of the invention.
Figure 4:
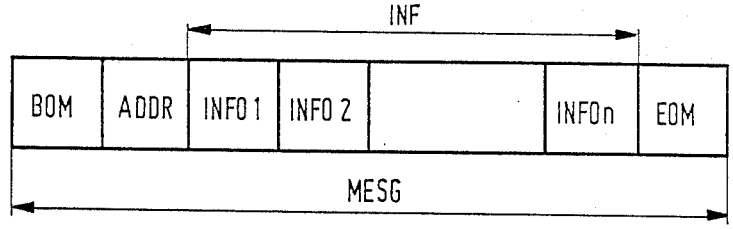
FIG. 4 shows the consecutive portions of a message according to the invention.

A message MESG is arranged as shown in FIG. 4. In consecutive fields (REC, FIG. 3) of the message channel the message MESG is transmitted in portions of predetermined maximum lengths. In addition to a message in the strict meaning, it is necessary that the receiver is also informed of the fact where the message starts, for whom the message is intended, what the message in the strict sense is, and where the message ends. For that purpose the following facts are recorded:

(i) the beginning of a message: is, for example, indicated by means of a special character, a check message BOM (begin of message);

(ii) the address of the receiver for which the message is intended: as, for example, located in the time slot subsequent to the time slot containing the check message BOM;

(iii) the actual, factual message, i.e. the above-mentioned message in the strict sense, and indicated by INF in the Figure. The message in the strict sense may comprise one or a plurality, generally n portions $info_i$, each portion being transmitted in one time slot (DATAB); and (iv) the end of a message: is indicated by a further, special character, a check message EOM (end of message).

To protect the message channel, in the sense that it is ensured that the correct message is actually and fully received, a number of protective measures have been taken. These measures provide that dropout of the transmitter, the absence of the receiver or receiver congestion (for example overflow in the information buffer of the receiver) and the occurrence of transmission errors are detected.

Dropout of the transmitter during the transmission of the message (INF, FIG. 4) can be detected by the receiver in that from a predetermined time slot onwards the message only contains information having the information value "NULL". This can be ascertained by using the above-described empty-time slot mechanism.

To detect the case in which the receiver for which the message is intended is not present, the addressed receiver reports his presence by writing, after reception of the EOM-message in a subsequent field of the message channel a further special character, a PRESENT message.

Starting from the assumption that the receiver does not have an unlimited buffer capacity, it is possible that a message applied cannot or not fully be stored, for example because the buffer is filled with other messages. At the moment at which the receiver detects that its buffer is completely full it reports this to the transmitter by writing a special character, an OVERFLOW message, in a time slot in the message channel.

Protection from transmission errors is effected in the following manner. Since the transmitter can be arranged such that it can detect whether the message has correctly passed through the ring, the receiver can be freed from that task. The message MESG can then be transmitted also without an error-detecting code. Thus, a receiver will not accept a received message as being correct, until after the transmitter has reported, by means of a relevant special character, a what is commonly referred to as an OK-message, that the overall message was correct. (The transmitter is given the opportunity to check the message transmitted by it, since it passes the transmitter one ring cycle later). The transmitter checks every portion of the message and, after the entire message MESG has been received back, will inform the receiver by, if the message was correct, the transmission of an OK-message in one of the fields of the message channel. If, in contrast therewith, the transmitter finds that the message is not correct, then it will repeat the message. On reading a new message the receiver decides—without having received an OK-message after the previous message—to reject the previous, apparently incorrect message and to record the new message.

It is also possible to address the message not only to one receiver but also to a group of receivers ("multicast") or to all receivers ("broadcast").

Figure 5:
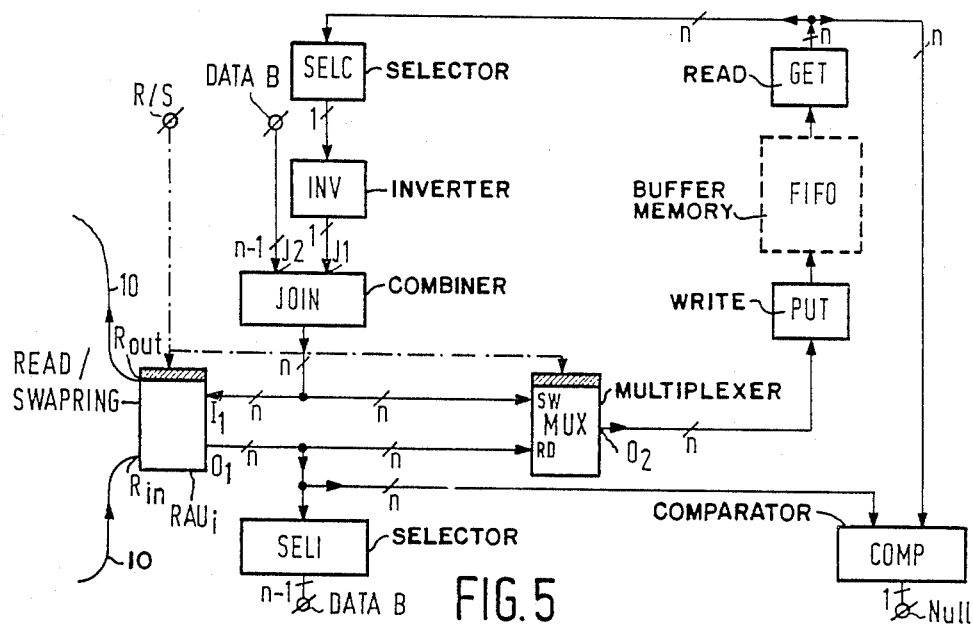
FIG. 5 is an embodiment of an arbitration arrangement, such arrangement forming part of each of the ring accessing arrangements shown in FIG. 1.

If the ring cycle consists of a total of $N_p$ frames, then there are at least $N_p$ time slots in the ring which are associated with the message channel. The content of these time slots is updated in each station in what is commonly referred to as a message channel model. This model (FIG. 5) is constituted by a first in-first out buffer memory FIFO and also a write arrangement PUT and a read arrangement GET. The write arrangement adds an element at the rear of the FIFO buffer, whilst the read arrangement GET reads the foremost element from the buffer, this element then being removed from the FIFO-buffer.

Additionally, the model includes an arrangement for reading information from the ring, READRING, and an arrangement combined therewith, SWAPRING, with the object of exchanging the information read from the ring with "own" information, that is to say, read first and write thereafter.

The arbitration mechanism proceeds in a number of phases.

In the first phase a candidate, that is to say a ring access arrangement of a system wanting to transmit a message, must wait for an "empty time slot". So as to enable detection thereof, the ring access arrangement reads via READRING the content of the passing time slots of the message channel and the value read is compared with the associated value such as it was found in the previous ring cycle. Passing time slots which are found to have an information value not equal to NULL are an indication for the ring access arrangement that another ring access arrangement has already reserved access to the message channel. If in contrast therewith the passing time slot has an information value NULL, then a message channel has become free and the relevant ring access arrangement can proceed to the second arbitration phase. The first phase is performed as follows.

The content of the message channel time slots is always stored in the FIFO-buffer and the content of the time slot read last is compared with the content of the corresponding time slot in the previous ringcycle, stored in the FIFO buffer. The output $O_1$ of the arrangement READRING is connected for that purpose to a switch multiplexer MUX and via that multiplexer MUX to the write arrangement PUT, and from the that write arrangement PUT to an input of the fifo-buffer FIFO. Output $O_1$ is also connected to an input of comparator arrangement COMP. A further input of comparator arrangement COMP is connected to an output of the buffer FIFO via the read arrangement GET. The information read from the ring is always written into the buffer FIFO via the write arrangement PUT, whilst this information is also always compared in the comparator arrangement COMP with the corresponding information which has written into the buffer FIFO one ring cycle earlier. If these two information contents correspond then the information value thereof is NULL and the message channel is free, and the second arbitration phase is proceeded to. In the case in which those information components are not equal then the message channel is occupied. The information DATAB in the read field REC is derived by a selection arrangement SELI connected to the output $O_1$ of the arrangement READRING.

The essence of the method in the first arbitration phase as described above is represented in Appendix 1 by the procedure "READ".

In the second arbitration phase it must be decided which of the candidates will be able to reserve the released message channel. After the candidates have detected that the channel is free, they will all respond thereto by exchanging the content of the relevant time slot in the subsequent frame by a special symbol, OCCUPIED. To that end the candidates utilize their exchange arrangement READ/SWAPRING which reads the information contained in the time slot and writes in the time slot the information DATAB having the value OCCUPIED. This is effected as follows. The multiplexer MUX and the arrangement SWAPRING are controlled by a signal R/S which indicates whether the arrangement SWAPRING to be used or not used and indicates in which (switching) state the multiplexer MUX is to be set. In the above-described first phase in which the ring 10 is only to be read, only the arrangement READRING is operative (the arrangement SWAPRING is inoperative) and the multiplexer MUX is switched such that its input RD is connected to output $O_2$ of the multiplexer MUX. In the second phase now to be described, the signal R/S does not only render arrangement READRING and the arrangement SWAPRING combined therewith operative, but the multiplexer MUX is switched such its input SW is connected to its output $O_2$. In the manner described already in the foregoing the message read is compared in comparator arrangement COMP with the message stored in the fifo-buffer.

The message to be placed on the ring by the arrangement SWAPRING is obtained as follows. The message contained in the fifo-buffer and read by the arrangement GET is applied to a selection arrangement SELC. The selection arrangement SELC reads the system bit (see SYSB in FIG. 3) and applies it via an inverter INV to an input $J_1$ of combining arrangement JOIN. The actual information portion (DATAB in FIG. 3) is applied to a second input $J_2$ of the combining arrangement. The resulting combination (REC, FIG. 3) is applied to an input $I_1$ of the arrangement SWAPRING and to the input SW of the multiplexer MUX. This results in the message REC being written on the ring (via SWAPRING) and also added to the rear of the buffer content by the multiplexer MUX and the arrangement PUT.

As has already been remarked in the foregoing, all the candidates in the second phase will respond to the release of the message channel by exchanging the content of the time slot read with the special symbol OCCUPIED. Consequently this symbol is recorded in the portion DATAB of the time slot REC (FIG. 3). This results in that the candidate nearest to the ring access arrangement—seen on the ring in the direction of transport—which has previously released the message channel will, after having performed the exchanging operation, have read the information value NULL from the ring. After having performed the exchanging operation, the other candidates will read an information value not equal to NULL on the ring and will conclude therefrom that the message channel has been reserved in the meantime for and by another candidate. These candidates now return to the first arbitration phase, i.e. wait for a time slot having an information value equal to NULL.

For the case in which only one frame is present on the ring, the arbitration phase has consequently ended and the sole remaining candidate can transmit a message over the message channel.

If several frames are simultaneously present on the ring, then there are as many time slots for the message channel on the ring as there are frames in a ring cycle. This implies that if the ring has been unoccupied during at least one ring cycle period there may be several candidates winning the second arbitration phase: basically, there can be as many winners as there are frames in a ring cycle. In phase 3 of the arbitration these winners will determine which of them will become the ultimate, final winner.

An essential portion of the method in the second arbitration phase as described above is illustrated in Appendix 2 by a procedure "SWAPRING".

In phases 3 and 4 use is made of a unique address (for example the station number) to determine which candidate will be the ultimate winner. To that end each candidate first exchanges the content of the subsequent time slots in the ring cycle with his own unique address. After this initialising phase the candidates will inspect the content of the read time slots in the fourth phase. If the address value read is higher than the own address of the relevant station then the station withdraws from the arbitration and proceeds to arbitration phase 1. If in contrast therewith the address value read is lower than its own address then the station will continue this arbitration phase. In the event in which the address value read is equal to the stations own address, then the station is the overall winner, as all the other candidates (having a lower address) have apparently withdrawn and consequently allowed the address of this candidate to pass.

This arbitration method is included in Appendix 3 in a "SEIZE-CHANNEL" procedure.

APPENDIX 1

The procedure READ based on the empty-time slot-mechanism.

The procedure READ relates to variables which are described, for a bucket of size n, by

```
type info-type = array [1 ... n−1] of binary;
type bucket-type = record
    system-bit : binary ;
    information : info-type
    end;
```

The boolean variable NULL is used to represent the information value

```
procedure READ (var mesg: info-type; NULL:boolean);
    var fifo-element, bucket: bucket-type;
    begin
        GET (fifo-element);
        READRING (bucket);
        PUT (bucket);
```

```
    mesg := bucket.information;
    NULL:= (bucket = fifo-element)
end;
```

APPENDIX 2

The procedure SWAP based on the empty-time slot-mechanism.

```
procedure SWAP (var mesg: info-type; NULL:boolean);
    var fifo-element, bucket: bucket-type;
    begin
        GET (fifo-element)
        bucket.system-bit:= inv (fifo-element.system-bit);
        bucket.information:= mesg;
        PUT (bucket);
        SWAPRING (bucket);
        mesg: = bucket-information;
        NULL:= (bucket = fifo-element)
    end ;
```

APPENDIX 3

The procedure SEIZE-CHANNEL based on the empty-time slot-mechanism.

```
procedure SEIZE-CHANNEL;
    const OCCUPIED;
    var
        mesg: info-type;
        NULL: boolean;
        count: integer;
    begin
        repeat
            repeat
                repeat
                    READ (mesg, NULL)
                until NULL ;
                mesg: = OCCUPIED;
                SWAP (mesg, NULL);
            until NULL;
            count: = 0 ;
        repeat
            mesg:= OWN-ADDRESS;
            SWAP (mesg, NULL);
            count:= count+1;
        until count = Np;
        repeat
            mesg:= OWN-ADDRESS;
            SWAP (mesg, NULL);
        until mesg ≧ OWN-ADDRESS ;
        until mesg = OWN-ADDRESS;
    end ;
```

What is claimed is:

1. A method of accessing and utilizing a message channel in a time division multiplex communication system in which digital information is transmitted between stations which are coupled to a unidirectional transmission ring, the ring including a monitor for generating an integral number of time division frames which cyclically traverse the ring, each such frame comprising a plurality of types of time slot fields, fields of the same type in consecutive frames constituting respective message channels for transmitting digital messages between the stations; such method being an arbitration procedure having a first phase characterized in that:

at least one of the message channels is utilized as an arbitration channel and each station wanting to transmit a message performs the following steps:

(a) reading the successive fields of the arbitration channel until the information in a field signifies that the arbitration channel is free, and assigning a value ("NULL") so signifying to such information;

(b) exchanging the information in the first field in the arbitration channel following the field indicating that the arbitration channel is free, for information transmitted by such station having a value ("OCCUPIED") signifying that the arbitration channel is now occupied; and (c) repeating steps (a) and (b) again if the information read in step (b) already has the value "OCCUPIED" until the information read in step (b) has the value "NULL", whereupon such station has won the first phase of the arbitration procedure and consequently has obtained access to the arbitration channel;

and transmission by the station which has won such first phase of the arbitration procedure of its message in one field or in a plurality of consecutive fields of the arbitration channel.

2. A method as claimed in claim 1, characterized in that a station which has read the information from a field in step (a) compares such information with the information read from or written into such field by such station one ring cycle earlier, and if they correspond such station assigns the value "NULL" to the so-read information and if they differ such station assigns a value "OCCUPIED" to the so-read information.

3. A method as claimed in either of claims 1 or 2, wherein two or more frames are present on the ring at any time and an equal number of stations win the first phase of arbitration performed in step (c), further characterized in that such stations perform a second arbitration procedure comprising the following steps to determine which of such stations wins access to the arbitration channel for use as a message channel;

(d) during one ring cycle period, each of such stations exchanges the content of all the fields associated with the arbitration channel for an address value identifying the relevant station;

(e) each of such stations reads and evaluates the address values contained in the fields of the arbitration channel in accordance with the following steps:

(f) such station withdraws from the arbitration and returns to step (a) if the so-read address value exceeds its own address value;

(g) such station continues the arbitration if the so-read address value is lower than its own address value; and (h) such station wins the final arbitration when the address value which is read is equal to its own address value as written in step (d).

4. A method of accessing and utilizing a message channel in a time division multiplex communication system in which digital information is transmitted between stations which are coupled to a unidirectional transmission ring, the ring including a monitor for generating an integral number of time division frames which cyclically traverse the ring, a plurality of such frames being present on the ring during each such cycle, each such frame comprising a plurality of types of time slot fields, fields of the same type in consecutive frames constituting respective message channels for transmitting digital information between the stations; such method being an arbitration procedure characterized in that:
  each station reads the information in each field of each frame present in a ring cycle and compares such information with the information which was read from or written into such field by such station one ring cycle earlier; and
  if the information so compared by a station from a present and prior ring cycle correspond with each other, such station assigns a message value ("NULL") to such information signifying that the relevant channel is unoccupied, and if the information so compared by a station differ from each other such station assigns a message value ("OCCUPIED") to such information signifying that the relevant channel is occupied;
  whereby each station coupled to said transmission ring can only obtain access to such ring when a message channel thereon is unoccupied.

5. A method as claimed in claim 4, further characterized in that during each ring cycle in which a station continues transmission of information in said ring, such station writes into each field of a message channel a message having a message value different from the message value written therein by such station in the previous ring cycle.

6. A system for accessing and utilizing a message channel in a time division multiplex communication system wherein digital information is transmitted between stations coupled to a unidirectional transmission ring, the ring comprising a monitor for generating an integral number of consecutive time division frames which cyclically traverse the ring, each frame comprising a plurality of time slot fields, fields of the same type in consecutive frames forming respective message channels for transmitting digital information between the stations, the digital information in each field including a system bit denoting if the corresponding message channel is unoccupied; such system being characterized in that each of said stations is coupled to the transmission ring by a ring access arrangement which comprises:
  a ring read arrangement which reads each passing field of a message channel during a ring cycle;
  a memory coupled to the ring read arrangement for storing the value of the content of the field read thereby;
  a comparator coupled to said ring read arrangement and to said memory for comparing the value of the content of a field which is read in a ring cycle with the value of the content thereof stored in the memory from the prior ring cycle, and producing an output signal signifying that the field is unoccupied when such values are the same;
  a selecting arrangement responsive to the output signal from said comparator for reading the system bit of the information stored in the memory and inverting it;
  a combining arrangement for combining the inverted system bit from the selecting arrangement with data signifying an occupied state of said field, to thereby produce a message signifying an occupied value of the content of said field; and
  a swapring arrangement coupled to said combining arrangement for transmitting said occupied message value in said field in place of the prior unoccupied value thereof.

* * * * *